Nov. 8, 1955

H. E. KIMES 2,722,717

TIRE MOLD

Filed July 3, 1950

INVENTOR.
*Harold E. Kimes*
BY
*Gary, Desmond & Parker*

ATTYS

United States Patent Office 2,722,717
Patented Nov. 8, 1955

2,722,717

TIRE MOLD

Harold E. Kimes, Chicago, Ill., assignor to Harold E. Kimes Corporation, Chicago, Ill., a corporation of Illinois Application July 3, 1950, Serial No. 171,813

3 Claims. (Cl. 18—42)

The present invention is a continuation-in-part of my copending applications Serial No. 66,437, filed December 21, 1948, now Patent No. 2,600,506, and Serial No. 112,711, filed August 29, 1949, now Patent No. 2,666,470.

This invention relates to tire molds and is more particularly concerned with the provision of means provided on a mold matrix to receive and support a chain of connected metallic inserts which are employed in a tire tread to prevent punctures or skidding during use of the tires on vehicles.

As set forth in my copending applications, the metal inserts are preferably formed of hard resilient wire and of generally U-shape with the ends of the arms projecting through the tire tread for engagement with a road surface. To facilitate manufacture of the inserts and the molding of same within tire treads, the inserts are preferably in the form of a chain of U-shaped members connected together at the ends of their legs. In molding a tread on a tire casing a chain of inserts must first be secured in fixed position upon the mold matrix, and the present invention contemplates the provision of a matrix provided with a guide strip upon which a chain of U-shaped metallic inserts may be supported in predetermined fixed position during the molding operation.

This invention further contemplates the provision of a guide strip which is formed to be snugly engaged between the resilient arms of the U-shaped inserts, the chain of U-shaped inserts being manually pressed into straddling relation upon the guide strip and held against accidental displacement by the clamping force exerted by the resilient arms.

This invention embodies other novel features, details of construction and arrangement of parts which are hereinafter set forth in the specification and claims, and illustrated in the accompanying drawing, wherein:

Figure 1:
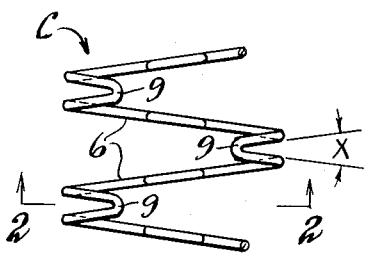
Fig. 1 is a plan view illustrating a chain of metallic inserts formed with arcuate resilient arms to straddle and engage a guide strip provided on a mold matrix.
Figure 2:
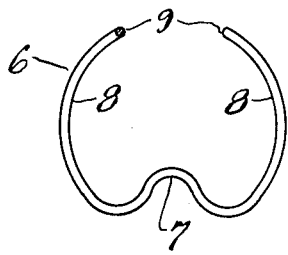
Fig. 2 is a transverse sectional view taken along the line 2—2 of Fig. 1.

Referring now to the drawing for a better understanding of this invention, and more particularly to Figs. 1 and 2 therein, the chain of metallic inserts C is shown as comprising a length of wire bent to define a series of generally U-shaped inserts 6 formed with curvilinear bases 7 and arcuate arms 8 which are bowed away from each other, the inserts being connected together at the ends of the arcuate arms by loop portions 9. The chain of metallic inserts may be formed from bronze wire, hardened steel wire, or other metal or alloy depending upon the physical characteristics desired and the type of service in which the tires are to be employed after the latter have been formed with treads having metallic inserts molded therein. In any event, it has been learned that the wire employed in forming the chain of inserts should have some resiliency in order to permit bending of the arms 8 during use in a tire tread without breakage, and further that the wire should be relatively hard to prevent undue wear of the arms during their engagement against the surface of a road. It has also been found desirable to substantially weaken the loop portions 9 connecting the U-shaped inserts together, the loop portions being weakened by flattening same or cutting part way through same. By providing a chain of metallic inserts with weakened loop portions 9, the inserts 6 are adapted to break away and be separated from each other almost immediately upon use of the tire upon a vehicle. As illustrated in Fig. 1, the angle X between the arcuate arms 8 of adjacent inserts may be from 10° to 75° depending upon the size and shape of the inserts. The chain of connected inserts C is adapted to be sold and shipped in rolls of predetermined size and weight and then cut into suitable lengths by the tire manufacturers and retreaders for mounting in tire mold matrices.

Figure 3:
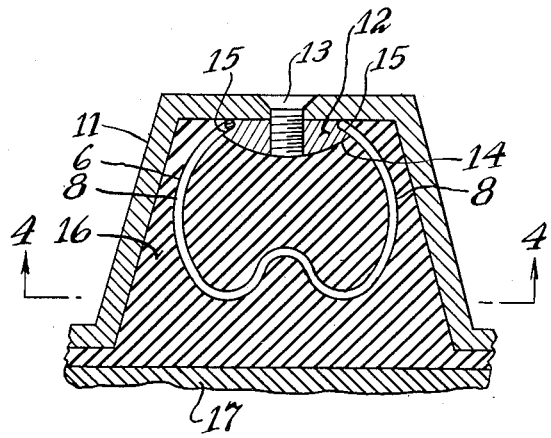
Fig. 3 is a fragmentary transverse sectional view illustrating the manner in which a chain of metallic inserts is supported upon the matrix guide strip.
Figure 4:
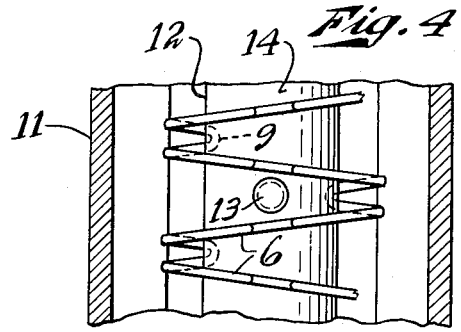
Fig. 4 is a detail sectional view taken along the line 4—4 of Fig. 3.

Figs. 3 and 4 in the drawing illustrate a portion of a tire mold matrix 11 having a guide strip 12 secured to its inner face by means of rivets or screws 13. It will, of course, be understood that matrices of various shapes and sizes may be provided with guide strips 12, depending upon the tread design desired. The guide strip 12 is preferably formed with a convex front face 14 to facilitate mounting of the chain of inserts C upon the strip. The strip 12 is also preferably formed with outwardly diverging side walls 15—15 to be engaged by the ends of the arcuate arms 8—8 of the metallic inserts. Due to the resiliency of the wire, a chain of inserts may be manually pressed into fixed position over the guide strip 12 to dispose the ends of the arcuate arms 8—8 in clamping engagement against the side walls 15—15 of the strip. A considerable saving in time may be effected by employing a roller (not shown) to press the chain of inserts into fixed position upon the guide strip 12. After the tread 16 has been molded onto a tire casing 17, it will be noted that the guide strip 12 may readily be withdrawn from its position between the arms 8—8 of the chain of inserts by merely opening the mold.

Figure 5:
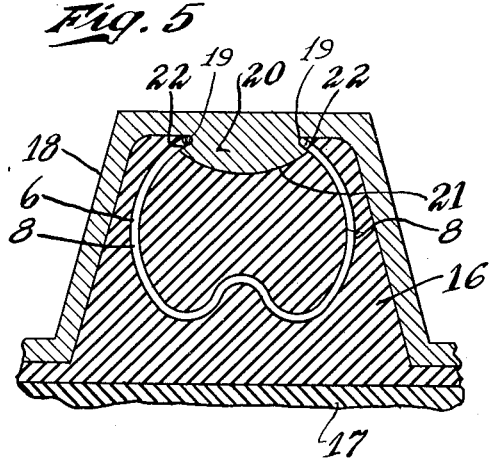
Fig. 5 is a fragmentary transverse sectional view, corresponding to Fig. 3, illustrating a modified form of this invention.

Fig. 5 illustrates a modified form of this invention in which the mold matrix 18 is formed with parallel grooves 19—19 to define a guide strip 20 having a convex front face 21 and outwardly diverging side walls 22—22. This form of the invention is otherwise similar to the form heretofore described in connection with Figs. 3 and 4 in the drawing.

From the foregoing description of this invention, illustrated in the drawing, it will be noted that the mold matrices now in use in molding treads onto tire casings may readily be provided with guide strips 12 to support chains of metallic inserts C, and that the guide strips will thus serve to accurately position and prevent displacement of the chain of inserts during the molding of a tread onto a tire. After the molding operation has been completed, the mold is opened in the usual manner to permit withdrawal of the finished tire.

While this invention has been shown in but two forms, it is obvious to those skilled in the art that it is not so limited but is susceptible of various changes and modifications without departing from the spirit and scope of the claimed invention.

I claim as my invention:

1. A tire mold matrix having an annular inner surface and axially spaced annular ribs to form a tread design, a ring-shape guide provided on said surface and spaced between said ribs, said guide having axially spaced ribs diverging inwardly from said surface to define therewith a pair of parallel annular recesses to receive the ends of a chain of generally U-shape resilient wire inserts adapted to be snapped into position to straddle said guide in spaced relation to said ribs.

2. A tire mold matrix having an annular inner surface and a pair of spaced annular ribs diverging inwardly from said surface to define therewith an inwardly facing annular channel, and an annular guide provided on said surface and having axially spaced side walls equidistantly spaced from adjacent ribs, said side walls converging toward said surface to define therewith a pair of parallel annular recesses adapted to receive the ends of a chain of connected resilient wire inserts formed with arcuate arms successively pressible into straddling engagement with said guide to form a ring of inserts spaced from said ribs.

3. Means for mounting a chain of generally U-shape resilient wire inserts along an annular inner surface of a tire mold to subsequently imbed said inserts within the tread portion of a pneumatic tire, said means comprising a guide on said inner surface having spaced side surfaces diverging therefrom to define therewith a pair of axially spaced parallel annular recesses to receive the ends of the U-shape inserts.

References Cited in the file of this patent

UNITED STATES PATENTS

| | | |
|---|---|---|
| 1,932,391 | Apple | Oct. 31, 1933 |
| 2,034,618 | Hawkinson | Mar. 17, 1936 |
| 2,121,956 | Eger | July 28, 1938 |
| 2,155,906 | Rihn et al. | Apr. 25, 1939 |
| 2,234,823 | Hewell | Mar. 11, 1941 |
| 2,339,696 | Hawkinson | Jan. 19, 1944 |
| 2,370,972 | Kraft | Mar. 6, 1945 |
| 2,479,474 | Crooker | Aug. 16, 1949 |
| 2,644,984 | Crooker | July 14, 1953 |